Nov. 18, 1958     V. A. BOUFFORT     2,860,715
VEHICLE PROVIDED WITH ADJUSTABLE ENDLESS TRACKS
Filed Jan. 26, 1955
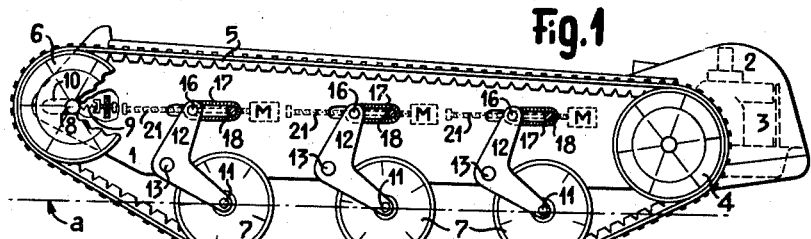
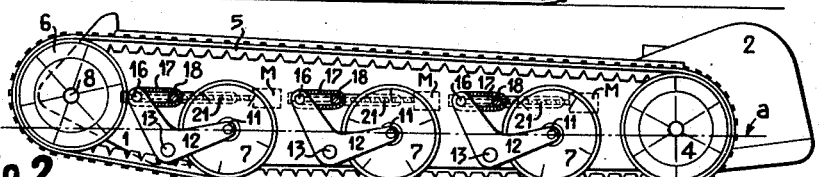
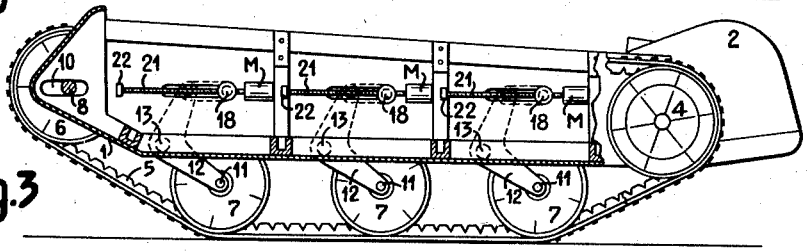
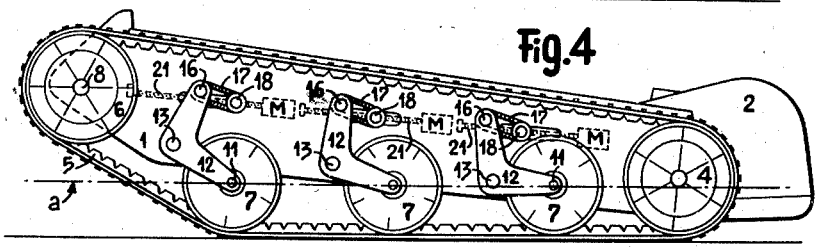
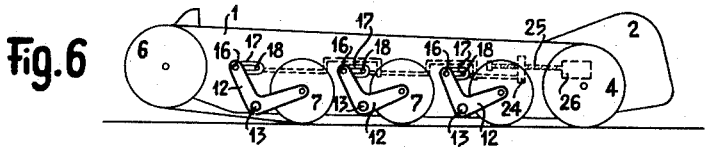
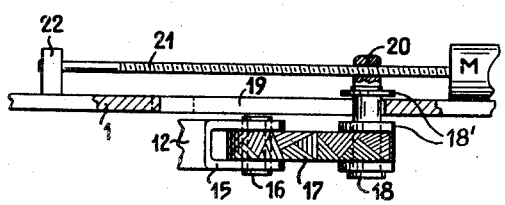
INVENTOR
VICTOR ALBERT BOUFFORT
BY Young, Emery & Thompson
ATTYS.

United States Patent Office 2,860,715
Patented Nov. 18, 1958

2,860,715

VEHICLE PROVIDED WITH ADJUSTABLE ENDLESS TRACKS

Victor Albert Bouffort, Paris, France, assignor to Mecatec S. A., Tangier, a limited-liability stock company of Tangier Application January 26, 1955, Serial No. 484,250

Claims priority, application Tangier February 15, 1954

3 Claims. (Cl. 180—9.1)

The present invention has for object a vehicle provided with endless tracks and comprising a frame provided with an engine driving the driving wheels and carried by carrying wheels used as guides for the endless tracks. This vehicle distinguishes from the known vehicles by the fact that said frame is connected with the carrying wheels by means of elastic suspension devices and by the fact that at least one pair of carrying wheels is connected with the frame by the intermediary of lifting devices, the whole being designed in such a manner as to allow to modify the position of the frame with reference to the axes of the carrying wheels.

Accompanying drawing illustrates diagrammatically and by way of example two embodiments of the vehicle forming the object of the invention.

Fig. 1 is a side view of the vehicle according to a first embodiment in its running position.

Fig. 2 is a view of said vehicle in its lowered position.

Fig. 3 is a cross-sectional view of the vehicle.

Fig. 4 is a detail view in firing position.

Fig. 5 is a detail view on a larger scale.

Fig. 6 is a side-view of the second embodiment of the vehicle.

According to Figs. 1 to 5, the vehicle comprises a frame 1 defining a cockpit provided at its rear end with a compartment 2 inside which is housed an internal combustion engine 3. Said latter drives a pair of driving wheels 4 secured to the ends of two transmission shafts.

These driving wheels, located on either side of the frame, drive two endless tracks 5 which are each guided by a sprocket or tightening member 6 and by carrying wheels or idlers 7. Each tightening member 6 revolves freely round a spindle 8 shiftable along a slot 10 and submitted to the action of a spring 9 tending to maintain the endless track tight. Each carrying wheel or idler 7 revolves freely round a spindle 11 secured to the end of one of the arms of a lever 12. Said latter is hinged to a pin 13 rigidly fastened to the frame. The second arm of said lever 12 carries at its end a fork 15 provided with a pin 16. Said pin 16 is elastically connected with a stud 18 by means of a ring 17 of rubber reinforced by canvas. Said stud 18 crosses a slot 19 made in the side wall of the cockpit defined by frame 1, and has flanges 18' thereon on either side of the side wall. These flanges 18' serve to steady and guide the stud 18. The end of said stud located inside the cockpit, is provided with a diametrically tapped bore 20 fitted over a threaded rod 21. Said threaded rod, driven by a motor M, is carried by a bearing 22.

From the preceding disclosure and from examination of accompanying drawing, it is readily apparent that the frame may be brought:

(1) into an upper position (Fig. 1) which allows the vehicle to run over any ground;

(2) into a lower position flattened on the ground (Fig. 2), in which the vehicle is no longer capable of moving;

(3) into any desired intermediate position between said upper and lower extreme positions.

When the frame is in its lowermost position, the height of the vehicle is less than that of a seated man, say less than 0.60 m. so that the vehicle is thus already entirely withdrawn from the sight of an observer by grass and by the slightest undulations of the ground.

Each carrying wheel being connected with the frame by the intermediary of an individual raising device actuated by an individual power unit, it is thus possible to make the frame assume any desired position with reference to the plane $a$ defined by the axes of the carrying wheels.

Thus, for instance, when the vehicle is running along a hilllside, it is possible by lowering the side of the frame nearest the hill, to set again partly or completely the floor of the cockpit into a horizontal plane. This peculiarity is not only an advantage from the standpoint of comfort for the driver and for the observer, but it also improves substantially the stability of the vehicle running along a hillside.

Lastly, it is possible to lower entirely or partly for instance only the rear part of the frame (Fig. 4) so as to make the vehicle nose up, or only the front part of the frame so as to facilitate the passage over a hindrance for instance.

This possibilty of lowering completely or partly the rear or the front while raising simultaneously the front or the rear of the vehicle, and consequently of making the frame assume any desired position with reference to ground, shows also considerable advantages when firing. As a matter of fact, this feature allows the mounting of a gun of a comparatively large bore (for instance 80 mm.) on the frame and to aim said gun by modifying the position of the frame of the vehicle with reference to the ground. In such a case, the frame of the vehicle constitute simultaneously the movable gun carriage of a piece of ordnance, the position of which carriage is adjustable.

The floor of the cockpit may be provided with one or more bearing and anchoring members, such as spades for instance, adapted when the frame is lowered, to engage the ground and to oppose during the firing, a shifting of the frame with reference to ground. These bearing and anchoring members may be rigid, retractable or removable. The frame of a vehicle, provided with such bearing and anchoring members forms, when it bears against the ground, a fixed gun carriage for a piece of ordnance.

By reason of the driving wheels being carried by the frame, the movements of said frame with reference to the carrying wheels, do not modify the position of the driving wheels with reference to the engine. Consequently the mechanical connections between the engine and the driving wheels are by no means modified by the movements of the frame. It follows that the raising devices of the frame may be set into action while the vehicle is running with a view of modifying the height of the frame in accordance with the nature of the ground or else to raise or lower the front or the rear of the vehicle to get over a difficult path.

As illustrated on the drawing and as described hereinabove, the raising devices connecting the axis of a carrying wheel with the frame comprise a supple and elastic member, so that said frame is elastically suspended and that each carrying wheel may follow individually the unevennesses of the ground.

An increase or a cutting down of the length of the section of an endless track which is in contact with the ground, resulting from a lowering or a raising of the frame, or else as a consequence of the unevennesses of the ground, is taken up by a corresponding displacement of the corresponding tightening member 6 under the action of, or in antagonism with the springs 9, which have a tendency to hold each endless track tight.

As illustrated on the drawing, each endless track is constituted by an endless strip of shaped and reinforced rubber. This type of endless track is very light on the one hand and, on the other hand, is extremely flexible. Consequently, said endless tracks are able to take up the unevennesses of the ground without any difficulty, while allowing furthermore high speeds to be reached, since they exert only comparatively low stresses on the wheels.

According to the modified embodiment illustrated on Fig. 6, the vehicle with endless tracks comprises a frame 1 carried by three pairs of carrying wheels. Each carrying wheel is connected with the frame by means of a raising device which is partly similar to that described with reference to Figs. 1 to 5. However, the three studs 18 located on the same side of the frame are connected by rigid connecting members with a common actuating member constituted by a nut 24 fitted over a threaded rod 25 actuated by a motor 26. According to this second embodiment, a same motor drives all the raising devices located on the same side of the vehicle.

Other embodiments adapted to the different requirements to be met, may be provided for without departing from the scope of the present invention. Furthermore, it is obvious that the mechanical raising devices described herein by way of example and with reference to the accompanying drawing, may be substituted by a hydraulic raising device for instance, constituted say by hydraulic jacks. It is however of advantage in order to maintain for the frame an elastic suspension for all positions it may assume with reference to the carrying wheels, to insert the raising devices in the connection connecting a carrying wheel spindle with its elastic suspension means.

In a further modification, the actuating motor of the raising device or devices may be left out and replaced simply by a crank, which allows to actuate by hand said raising device or devices.

I claim:

1. In a motor vehicle provided with endless tracks and comprising a frame having lateral walls and enclosing a cockpit and a motor carried by said frame, driving wheels carried by said frame and disposed laterally at the rear end of said frame, said driving wheels being mechanically connected to said motor, a sprocket on either side of the front end of said frame and carried thereby, the combination of tightening devices acting on said sprockets in order to tighten said tracks, said tightening devices comprising tightening springs, a pivoting axle for said sprockets, longitudinal slots in the lateral walls of said frame, said axle being mounted slidably in said slots and subjected to the action of said tightening springs whereby said sprockets are subjected to two forces of opposite directions constituted by the force of said tightening springs and the force of said tensioned tracks take automatically a position which adapts the spacing of the rotation axes of said driving wheels and said sprockets to the shape given to said tracks, whereby said tracks remain tight irrespective of the position of said frame above the ground, angled levers hinged to said frame on either side thereof, a carrying wheel revolvably mounted on the lower end of each of said angled levers and rolling along the inner side of said endless tracks, elastic rings connecting the second end of each of said angled levers to a fastening member, whereby said elastic rings constitute simultaneously on the one hand connecting members of the second end of each angled lever with one fastening member and on the other hand suspension members of said frame and allowing further an individual up-and-down movement of each carrying wheel under the action of the unevenness of the ground, a driving device mechanically connected to each of said fastening members, slots made in said lateral walls of said frame, said fastening members crossing said slots and said driving devices being located inside said frame, whereby said driving devices are operable from the inside of said cockpit to modify at will during the running of said vehicle, the position of said frame above the ground.

2. In a motor vehicle provided with endless tracks and comprising a frame having lateral walls, a motor carried by said frame, driving wheels carried by said frame and disposed laterally at one end of said frame, said driving wheels being mechanically connected to said motor, a sprocket disposed on either side of the front end of said frame, tightening devices acting on said sprockets in order to tighten said tracks, the combination of angled levers hinged to said frame on either side thereof, an idler revolving on the lower end of each of said angled levers, actuating members, elastic rings connecting the second end of each angled lever to one actuating member, driving means located inside said frame and driving said actuating members, guiding means provided in said lateral walls of said frame for guiding said actuating members and comprising slots in said lateral walls, said actuating members extending through said slots, and flanges on said actuating members on either side of said walls, whereby said elastic rings constitute simultaneously connecting members of the second end of each angled lever with one actuating member and suspension members of said frame.

3. In a motor vehicle provided with endless tracks and comprising a frame having lateral walls, a motor carried by said frame, driving wheels carried by said frame and disposed laterally at one end of said frame, said driving wheels being mechanically connected to said motor, a sprocket disposed on either side of the front end of said frame, tightening devices acting on said sprockets in order to tighten said tracks, the combination of angled levers hinged to said frame on either side thereof, an idler revolving on the lower end of each of said angled levers, actuating members, elastic rings connecting the second end of each angled lever to one actuating member, driving means located inside said frame and driving said actuating members, guiding means provided in said lateral walls of said frame for guiding said actuating members, said lateral walls having extending openings therein and said actuating members extending through said extended openings, whereby said elastic rings constitute simultaneously connecting members of the second end of each angled lever with one actuating member and suspension members of said frame.

References Cited in the file of this patent

UNITED STATES PATENTS

| 1,340,789 | Ollivier | May 18, 1920 |
| 1,359,997 | Kastner | Nov. 23, 1920 |
| 2,011,564 | Barnes | Aug. 20, 1935 |
| 2,011,565 | Barnes | Aug. 20, 1935 |
| 2,374,240 | Shankman | Apr. 24, 1945 |
| 2,495,057 | Dillingham | Jan. 17, 1950 |
| 2,604,317 | Koller | July 22, 1952 |